United States Patent Office 3,714,338
Patented Jan. 30, 1973

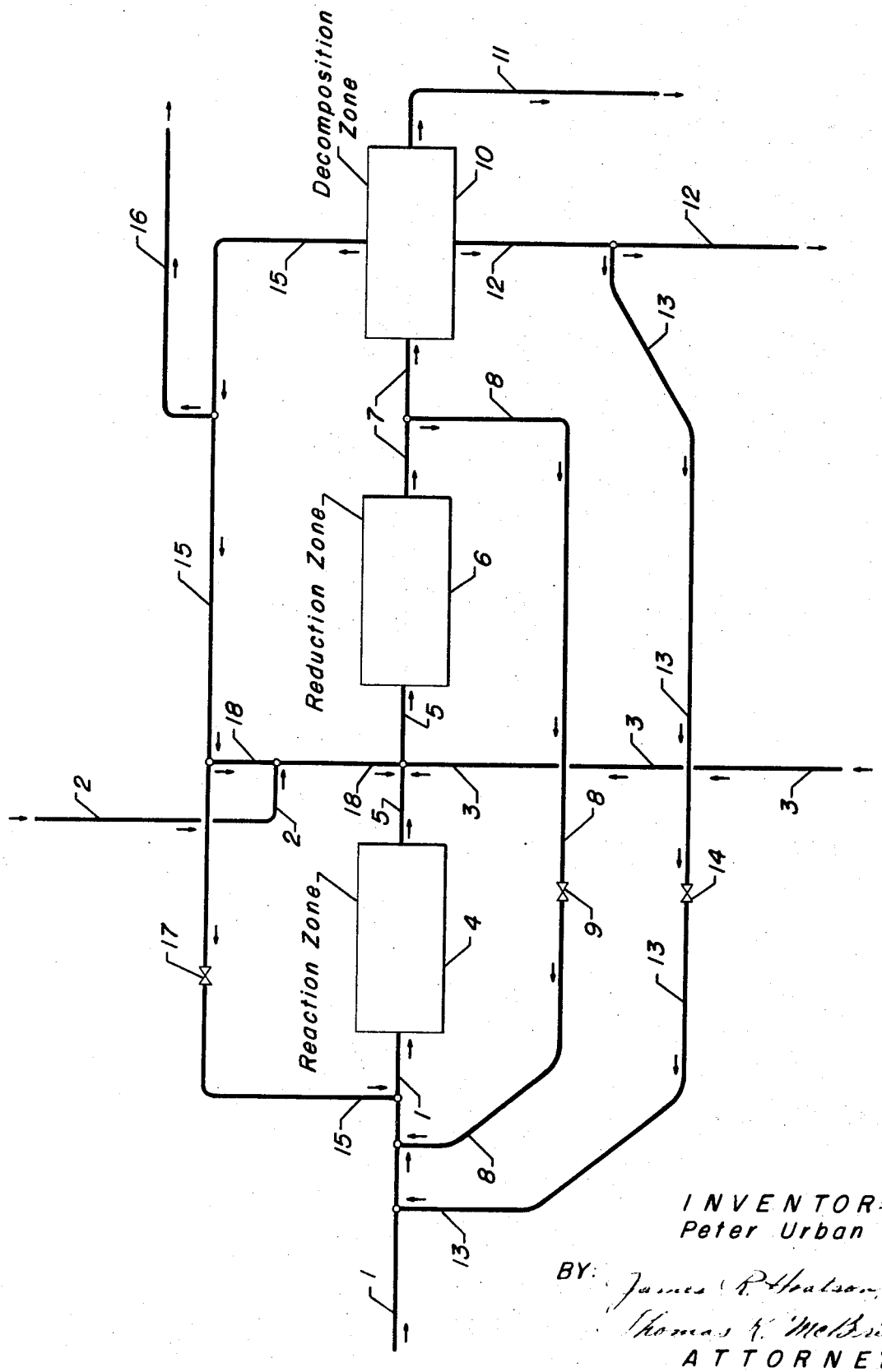
INVENTOR:
Peter Urban

3,714,338
TREATING A WATER STREAM CONTAINING A SULFITE COMPOUND TO PRODUCE ELEMENTAL SULFUR
Peter Urban, Northbrook, Ill., assignor to Universal Oil Products Company, Des Plaines, Ill.
Filed Dec. 18, 1970, Ser. No. 99,482
Int. Cl. C01b 17/02
U.S. Cl. 423—571
21 Claims

ABSTRACT OF THE DISCLOSURE

A water stream containing a water-soluble sulfite compound is treated in order to produce elemental sulfur while minimizing the formation of sulfate by-products by the steps of: (a) converting the sulfite compound contained in the water stream to the corresponding thiosulfate compound; (b) treating the resulting thiosulfate compound with a water-soluble sulfide compound and a reducing agent, selected from the group consisting of carbon monoxide, hydrogen and mixtures thereof, at reduction conditions selected to result in an effluent stream containing a polysulfide compound; (c) decomposing the resulting polysulfide compound to form elemental sulfur, a sulfide compound, a treated water stream and; (d) recovering the resulting sulfide compound and passing same to step (b). Principal utility of this treatment procedure is associated with the regeneration of a sulfite-containing absorbent stream which is commonly produced by contacting a flue gas stream containing sulfur dioxide with a suitable aqueous absorbent stream containing an alkaline reagent.

The subject of the present invention is a multi-step process for the selective treatment of an aqueous stream containing a water-soluble sulfite compound in order to produce elemental sulfur and reduce the total sulfur content (i.e. the total amount of sulfur contained therein in any form, expressed on an elemental sulfur basis) of the water stream to the point where it can be reused in the process which produced it, or alternatively it can be safely discharged into a suitable sewer without causing a major pollution problem. More precisely, the present invention involves a novel multi-step process for treating a sulfite-containing water stream wherein the first step involves conversion of the sulfite compound to the corresponding thiosulfate compound, the second step comprehends reduction of the resulting thiosulfate compound to form the corresponding polysulfide compound, the third step involves the decomposition of the polysulfide produced in the second step to form a sulfide compound, elemental sulfur and the treated water stream, and the final step involves passing at least a portion of the sulfide product of the third step to the second step. In one important aspect, the present invention has to do with the treatment of an aqueous sream containing ammonium sulfite or ammonium bisulfite to produce elemental sulfur and and a treated aqueous stream having a greatly reduced total sulfur content and being substantially free of ammonium sulfate. In another important aspect, the present invention relates to the treatment of a rich absorbent stream, which is produced by scrubbing a gas stream containing sulfur dioxide with an aqueous solution containing a suitable alkaline reagent, in order to regenerate the absorbent stream so that it can be reused to absorb additional quantities of sulfur dioxide.

A major problem encountered in many areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc. to produce flue or stack gas streams containing sulfur dioxide. Similarly, waste gas streams of this type are generally produced by other industrial processes such as the smelting of sulfur-bearing ores, the refining of sulfur-containing crude oils, the synthesis of sulfuric acid, the sulfonation of hydrocarbons, the production of coke, the production of sulfur in a Claus process, the production of paper via a wood pulping process and the like industrial processes. It is well known that the indiscriminate discharge of these gas streams into the atmosphere results in a substantial air pollution problem because the sulfur dioxide has extremely detrimental effects on animal and plant life. In addition, the discharge of these gas streams into the atmosphere constitutes a waste of a valuable material because the sulfur contained in same is an industrial commodity. Many processes have been proposed for removal of sulfur dioxide from these gas streams. A large percentage of these proposed removal procedures involve contacting the sulfur dioxide containing gas stream with an aqueous absorbent stream which typically contain materials which chemically or physically react with the sulfur dioxide in order to absorb same into the liquid solution. A common procedure involves the use of a solution of an alkaline reagent such as ammonium hydroxide, sodium hydroxide, sodium carbonate, ammonium carbonate, and the like alkaline reagents, to produce a rich absorbent stream containing the corresponding sulfite compound. Likewise, similar aqueous solution containing salts of sulfurous acid produced in many areas of modern industry such as in the chemical, petrochemical, pharmaceutical, steel, paper, food, fertilizer, petroleum and the like industries.

Because these water streams contain sulfite compounds, their discharge into a waste water sewer can cause substantial, well-known water pollution problems including excessive biological oxygen demands, poisoning of marine and plant life and the like. Regardless of the sources of these aqueous sulfite-containing streams, it is clear that there is a substantial need for a simple and effective method for treating them in order to allow their reuse in the processes which produced them or their safe discharge into a suitable sewer. In the case where the treated water stream is to be recycled to the process which produced the input water stream, it is generally required that the treated water streams be substantially free of sulfate compounds. The reason for this requirement is that these compounds, once formed, are very intractable and in a closed system tend to build up in the recycle water stream until finely divided solids are formed. These solids then can precipitate in the form of a scale or sludge which can foul the internals of the equipment using this recycle stream. For instance, when the treated stream is recycled to a gas scrubbing process, these sulfate compounds can cause severe corrosion and erosion difficulties in the scrubbing equipment, plus they can foul the internals of the scrubbing means. When a drag stream is withdrawn from the process and discarded or treated by a method such as crystallization, evaporation, filtration, etc., to remove these sulfate compounds, valuable alkaline reagent is typically lost from the system. Moreover, the yield of sulfur recovered during the water treatment operation is detrimentally affected by these sulfate by-products.

One solution that has been proposed to the problem of treating these sulfite-containing water streams is the use of a suitable reducing agent to react with the sulfite compounds contained therein to make elemental sulfur and/ or the corresponding sulfide compound. However, despite stringent precautions, when common reducing agents such as hydrogen, a suitable sulfide compound, or carbon monoxide are used in an attempt to directly reduce these sulfite compounds to elemental sulfur or the corresponding sulfide compounds, undesired sulfate compounds are formed in unacceptable amounts. These sulfate compounds are believed to be caused by the sulfite compounds undergoing auto-oxidation-reduction at the conditions necessary for direct reduction.

In many areas of industry where these sulfite-containing water streams are produced, it is required that not only undesired sulfate by-products be minimized but also that the sulfur content of the stream be recovered in the form of elemental sulfur. Elemental sulfur is the preferred product of the treatment procedure primarily because it finds a ready market in most areas of the world since it is a basic industrial commodity. In addition, elemental sulfur is relatively easily handled as compared to hydrogen sulfide or solutions of water-soluble sulfide compounds.

Besides these requirements for minimizing of sulfate make and for elemental sulfur as the primary product, there is another very important constraint on a workable solution to this problem of treating these sulfite-containing streams. This last requirement has to do with the economics associated with the reducing agent utilized. For a process to be acceptable on a world wide basis, the primary reducing agent utilized must not only be highly effective and available, but also must be relatively cheap in order to make the solution to this problem viable and economically attractive. Considering all of the factors that enter into the cost and availability of common reducing agents, I have ascertained that the ones which satisfy this economic criteria are carbon monoxide, hydrogen or a mixture of hydrogen and carbon monoxide. Of these, a mixture of carbon monoxide and hydrogen is preferred for this purpose because the technology for its production is widely available. This availability is primarily caused by the widespread utilization of the catalytic steam reforming process for ammonia synthesis gas production and high purity hydrogen production.

The major problem addressed by the present invention is, therefore, to provide a workable procedure for treating the sulfite-containing water stream in order to directly produce elemental sulfur in a highly selective manner to produce a treated aqueous stream of greatly reduced total sulfur content, to minimize the amount of undesired sulfate by-products and to enable the use of relatively economic reducing agents in the primary reduction step.

I have now found a highly efficient process for treating an input water stream containing a water-soluble sulfite compound which provides an efficient and uncomplicated solution to this problem. Key features of my process involve: (1) the selective conversion of the sulfite compound contained in the input water stream to the corresponding thiosulfate compound in a preliminary treatment step; (2) the subsequent selective reduction of this thiosulfate compound with a mixture of a water-soluble sulfide solution and a reducing agent selected from the group consisting of carbon monoxide, hydrogen and mixtures thereof, to directly form the corresponding polysulfide compound in a primary reduction step; (3) the decomposition of the resulting polysulfide to form elemental sulfur, a sulfide compound and a treated water stream; (4) the use in the primary reduction step of the sulfide compound formed in the decomposition step; (5) the minimization of undesired sulfate by-products during all of these steps; and (6) the use of a relatively inexpensive reducing agent $H_2$ or $CO$ in the primary reduction step to supply at least the major portion (and typically all) of the reducing reagent required for the overall process.

The basic concept of the present invention is primarily based on my observation that the sulfite compound contained in this input water stream can be easily converted at relatively low severity conditions to the corresponding thiosulfate compound in a highly selective manner without forming any substantial amounts of undesired, intractable sulfate compounds. Coupled with this observation is my additional finding that the resulting thiosulfate compound can be reduced in an aqueous solution at relatively mild conditions. As mentioned above, for reasons of costs and availability of technology, it is desired to use as a reducing agent in this thiosulfate reduction step either carbon monoxide or hydrogen or a mixture of same. Unfortunately, an extensive series of experiments on the reduction of aqueous solutions of thiosulfate comopunds with these preferred reducing agents over a broad range of process conditions and using a wide spectrum of potential catalysts, clearly demonstrates that the predominant product of this reduction reaction when these reducing agents are utilized is the corresponding sulfide compound. Since elemental sulfur is the desired product, as previously explained, this tendency to form the corresponding sulfide compound seemed to present a major barrier to a viable process where an attempt is made to directly reduce the thiosulfate compound to elemental sulfur in an aqueous solution with the preferred reducing agents. As a result of my work in batch reactors on this thiosulfate reduction reaction, I have now discerned that this preference for sulfide as the principal product can be reversed and the product structure shifted towards elemental sulfur if a water-soluble sulfide compound is present initially in the reaction mixture. Without the intention of limiting my invention by this explanation, I attribute this beneficial effect of the initial presence of sulfide on this reaction to an apparent requirement for a minimum amount of sulfide reactant during an initial portion of the reduction reaction in order to enable the reaction route to sulfur. That is, the reaction of thiosulfate with carbon monoxide or hydrogen appears to first form sulfide which then builds up to the point that reaction with additional quantities of thiosulfate to form sulfur becomes possible. Hence, the central point of the instant process is that a water-soluble sulfide compound is also charged in admixture with the carbon monoxide and/or hydrogen to the primary reduction step. This feature of the instant process enables the formation of polysulfide in the primary reduction step and greatly simplifies the overall process flow scheme. In sum, the present invention provides a reaction procedure which starts with a sulfite compound, converts it to the corresponding thiosulfate compound, converts this to a polysulfide compound and then recovers elemental sulfur from polysulfide by any of the methods known to those skilled in the art. Thus sulfite-to-thiosulfate-to-polysulfide-to-sulfur route provides a procedure which facilitates careful control of by-product formation during the treatment procedure and enables the use of relatively low cost reducing agents.

It is, accordingly, an object of the present invention to provide a simple, effective, economic and selective method for treating a sulfite-containing input water stream to produce elemental sulfur and a treated water stream of greatly reduced total sulfur content. A second object is to provide a process of this type which minimizes the formation of undesired, refractory sulfate by-products. Another object is to provide a process of this type which can utilize carbon monoxide and/or hydrogen as the primary reducing agent.

In brief summary, the present invention is, in one broad embodiment, a process for treating an input water stream containing a water-soluble sulfite compound in order to produce elemental sulfur and a treated water stream while minimizing the formation of undesired sulfate by-products. In a preliminary treatment step, the sulfite-containing water stream is contacted with a first reducing agent, selected from the group consisting of finely divided sulfur, a polysulfide compound, a water soluble sulfide compound and mixtures thereof, at thiosulfate production conditions selected to form a thiosulfate-containing effluent stream. The effluent stream from this first step is then reacted, in a primary reduction step, with a water-soluble sulfide compound and a second reducing agent selected from the group consisting of carbon monoxide, hydrogen and mixtures thereof, at reduction conditions selected to result in an effluent stream containing a polysulfide compound. In the next step, at least a portion of the effluent stream from the primary reduction step is subjected to polysulfide decomoposition conditions effective to form elemental sulfur, a sulfide compound and a treated water stream. In the final step, the sulfide compound formed in the decomposition step is recovered and at least a portion of it is passed to the primary reduction step in order to furnish at least a portion of the sulfide reactant used therein.

In another embodiment the present invention is a process as outlined above in the first embodiment wherein the primary reduction step is performed in the presence of a catalyst comprising a combination of a catalytically effective amount of a metallic component, selected from the group consisting of the transition metal of groups VI and VIII of the Periodic Table and compounds thereof, with a porous carrier material.

In still another embodiment the process of the present invention is a process as delineated in the second embodiment where the catalyst is cobalt sulfide combined with activated carbon.

In a more specific embodiment, the present invention is a process for treating an input water stream containing ammonium sulfite or bisulfite in order to produce elemental sulfur and a treated water stream while minimizing the formation of undesired ammonium sulfate. In the first step, the input water stream is contacted with a first reducing agent, selected from the group consisting of finely divided sulfur, ammonium polysulfide, hydrogen sulfide, ammonium hydrosulfide and mixtures thereof, at thiosulfide production conditions selected to form an effluent stream containing ammonium thiosulfate. The resulting effluent stream is then reacted, in a primary reduction step, with a mixture of hydrogen sulfide and a second reducing agent, selected from the group consisting of carbon monoxide, hydrogen, and mixtures thereof, at reduction conditions selected to result in an effluent stream containing ammonium polysulfide. This effluent stream containing polysulfide is then, in the next step, subjected to polysulfide decomposition conditions effective to form elemental sulfur, hydrogen sulfur and a treated aqueous stream. The hydrogen sulfide formed in this decomposition step is then, in the final step, recovered and at least a portion of it is passed to the primary reduction step in order to provide at least a portion of the hydrogen sulfide reactant used therein.

Another more specific embodiment involves the process as outlined above in this last embodiment wherein the primary reduction step is performed in the presence of a catalyst comprising a combination of catalytically effective amounts of a metallic sulfide selected from sulfides of the metals of groups VI and VIII of the Periodic Table combined with the porous carrier material.

Other objects and embodiments of the present invention include additional details about particular input streams, output streams, reagents, conditions, catalysts and mechanics associated with each of the essential and preferred steps involved therein. These are hereinafter disclosed in the following detailed discussion of the elements that comprise the present process.

As indicated above, the first step of the present process is a preliminary treatment step which involves the conversion, in a highly selective manner of the sulfite compound contained in the input water stream to the corresponding thiosulfate compound with a first reducing agent. The sulfite compound contained in this input water stream is generally characterized as water-soluble. Examples of water-soluble sulfite compounds are sulfite salts of relatively common bases such as ammonium sulfite, the alkali metal sulfites and the alkaline earth sulfites. In addition to the normal sulfite salts, it is intended to include the bisulfite salts of the relatively strong bases. Especially suitable alkali metal sulfite compounds are sodium sulfite or bisulfite and potassium sulfite or bisulfite. Likewise, suitable alkaline earth sulfites are exemplified by magnesium sulfite. The preferred sulfite compounds for purposes of the present invention are ammonium sulfite and sodium sulfite. Ordinarily, the sulfite compound will be present in this input aqueous solution in an amount ranging from about 0.01 wt. percent up to the solubility limit of the particular sulfite compound in water at the conditions utilized in this first step. Particularly good results are obtained when the input water stream contains about 0.1 to about 30 wt. percent of the sulfite compound. It is to be noted that in many cases the input water stream of this step will contain a mixture of a normal sulfite salt and a bisulfite salt such as a mixture of $(NH_4)_2SO_3$ and $NH_4HSO_3$ or a mixture of $Na_2SO_3$ or $NaHSO_3$.

The reducing agent utilized in the preliminary treatment step is selected from the group consisting of finely divided sulfur, a polysulfide compound, a water-soluble sulfide compound and mixtures thereof. In the first mode of operation of this step, finely divided sulfur is utilized as the reducing agent. It is preferred that the sulfur be present in particle size of about 10 to about 250 microns, with best results obtained with particles of about 25 to about 100 microns. Typically, it is a good practice to introduce the sulfur into this step via a water stream containing a slurry of finely divided sulfur in an amount of about 1 to about 75 wt. percent thereof, although many other suitable means for injecting finely divided solid particles can be utilized if desired. In this first mode of operation, it is preferred to also utilize a wetting agent in the reaction mixture in order to facilitate good contact of the elemental sulfur with the sulfite compound. Suitable wetting agents are: the salts of alkyl aryl sulfonates such as the sodium salt of dodecylbenzene sulfonate; sulfonated fatty acid ester; $C_{12}$ to $C_{16}$ alkyl sulfates; $C_{12}$ to $C_{16}$ alkyl sulfonates; alkyl polyoxyethylene alcohols; ethylene oxide condensation products of alkyl phenols; quaternary ammonium salts such as octadecyldimethylbenzyl ammonium chloride and the like wetting agents. The wetting agent is preferably utilized in a relatively small amount corresponding to about 0.01 to about 1 wt. percent of the sulfite compound that is reacted. The amount of elemental sulfur utilized in this first mode of operation of the first step should be sufficient to supply one atom of sulfur per molecule of sulfite compound contained in the input water stream, with the preferred amount corresponding to about 1 to about 3 atoms of sulfur per mole of sulfite compound. A preferred source for the sulfur reagent in this mode of operation of this step is a portion of the sulfur formed in the subsequently described polysulfide decomposition step.

In a second mode of operation for this preliminary treatment step, the first reducing agent is a polysulfide compound. Suitable polysulfide compounds are the water-soluble polysulfides including the ammonium, alkali metal, and alkaline earth polysulfides. Best results are ordinarily obtained with ammonium polysulfide. The polysulfide compound is ordinarily charged to this first step in the form of an aqueous solution containing about 1 to about 50 wt. percent of the polysulfide compound. It is to be noted that when the reducing agent is a polysulfide compound, no wetting agent is necessary in order to achieve good contact with the sulfite compound. The amount of the polysulfide compound charged to this step is preferably sufficient to provide at least the stoichiometric amount necessary for the reaction between it and the sulfite compound to produce the corresponding thiosulfate compound. In the typical case where the polysulfite compound contains four atoms of elemental sulfur and one atom of sulfide (e.g. $(NH_4)_2S_5$), the stoichiometric amount is ⅙ mole of polysulfide per mole of sulfite compound, with a preferred value being about ¼ to about ¾ or more mole of polysulfide per mole of sulfite compound. A preferred internal source for the polysulfide reactant in this mode of operation is a portion of the polysulfide-containing effluent stream produced in the primary reduction step.

In a third mode of operation of this first step, the reducing agent is a water-soluble sulfide compound. Suitable water-soluble sulfide compounds are hydrogen sulfide, ammonium sulfide, ammonium hydrosulfide and the sulfides and hydrosulfide salts of the alkali and alkaline earth metals. Best results are ordinarily obtained in this mode of operation of this step when the sulfide reactant is hydrogen sulfide or ammonium hydrosulfide. The amount of this sulfide reactant utilized in this step is at least sufficient to provide 0.5 mole of sulfide compound per mole of sulfite compound contained in the input water stream, with best results obtained at a mole ratio corresponding to about 0.6 to about 1.5 or more. Likewise, in this third mode of operation, good results are ordinarily obtained when the pH of the input water stream is in the range of 4 to about 7. Once again a preferred internal source for the sulfide reactant for this mode of operation is a portion of the sulfide compound recovered from the polysulfide decomposition step.

Conditions utilized in this preliminary step can be generally described as thiosulfate production conditions and comprise: a relatively low temperature of about 20 to about 150° C., preferred 50 to 100° C., a pressure at least sufficient to maintain the input water stream in the liquid phase and a relatively short contact time corresponding to about 0.05 to 0.5 or more hours. In general, the contact time necessary for the desired reaction is a function of the reducing agent utilized, with relatively short contact times of about 1 to 5 minutes being sufficient in the case where the reducing agent is a polysulfide compound. The other two reducing agents require a relatively longer contact time ranging up to about 0.1 to about 0.5 hour. Considering all of the factors involved in the operation of this preliminary treatment step, best results are ordinarily obtained when the reducing agent is hydrogen sulfide or a polysulfide compound, particularly ammonium polysulfide.

Following this preliminary treatment step, an aqueous effluent stream containing relatively large amounts of the corresponding thiosulfate compound is withdrawn from this first step and passed to the primary reduction step of the present invention. This aqueous effluent stream may contain minor amounts of unreacted sulfite compound and unreacted first reducing agent and very minor amounts of undesired sulfate compound. Typically, with the first reducing agents and conditions mentioned above, greater than 90% of the sulfite present in the input water stream is converted to thiosulfate with less than 5% being converted to the undesired, intractable sulfate. In accordance with the present invention, this effluent stream is reacted, in the primary reduction step, with a mixture of a water-soluble sulfide compound and a second reducing agent. The second reducing agent is selected from the group consisting of carbon monoxide, hydrogen and mixtures thereof.

It is an essential feature of the present invention that a water-soluble sulfide compound is charged to this primary reduction step. This water-soluble sulfide compound is typically selected from the following group: hydrogen sulfide, ammonium sulfide, ammonium hydrosulfide and the sulfides and hydrosulfides of the alkali and alkaline earth metals. Best results are ordinarily obtained when this sulfide reactant is hydrogen sulfide or the sulfide salt corresponding to the alkaline reagent present in the input water stream. For example, when the input water stream contains ammonium sulfide, the preferred sulfide reactants are hydrogen sulfide and/or ammonium hydrosulfide. The sulfide reactant for use in this step may be derived from external or internal sources. Suitable external sources are $H_2S$ streams produced by scrubbing common $H_2S$-containing gas streams which are available in the petroleum refining industry, the steel industry and the like industrial sources of $H_2S$-contaminated gas streams. Yet another external source for the sulfide reactant are well known processes for converting elemental sulfur into $H_2S$ by reacting same with hydrogen, hydrocarbons or steam. After the instant process in started-up and lined-out, it is a feature of the present invention that at least a portion of this sulfide reactant is obtained from an internal source; specifically, a portion of the sulfide compound produced in the subsequently described polysulfide decomposition step. In many cases it is a preferred mode of operation of the present process to derive essentially all of the sulfide reactant necessary for this primary reduction step from this polysulfide decomposition step. This sulfide reactant is charged to this step in an amount which is sufficient to result in a mole ratio of sulfide to second reducing agent of about 0.05:1 to about 1:1. In most cases when the sulfide reactant is completely furnished by recovery of the sulfide product of the decomposition step, this mole ratio will be in the range of about 0.1:1 to about 0.5:1. It is to be noted that my finding with regard to the amount of the sulfide reactant is that a minor amount of same will act to shift the selectivity of the products produced in this primary reduction step towards elemental sulfur bound up in polysulfide.

The other essential reactant for this primary reduction step is the second reducing agent which is selected from the group consisting of carbon monoxide, hydrogen and mixtures thereof. In the case where this reducing agent is hydrogen, it may be substantially pure hydrogen or a mixture of hydrogen with other relatively inert gases such as a mixture of hydrogen with $C_1$ to $C_4$ hydrocarbons, a mixture of hydrogen and nitrogen and the like mixtures. The excess recycle gas from various petroleum processes which have a net hydrogen make such as a reforming process, dehydrogenation process and the like may be utilized as desired. Likewise, a hydrogen stream suitable for use here may be derived from a catalytic steam reforming process with an attendant shift conversion operation, from partial oxidation of liquid hydrocarbons, from gasification of solid carbonaceous material and from electrolysis of water.

In the case where this second reducing agent is carbon monoxide, it may be obtained from any suitable source or prepared in any suitable manner. An acceptable carbon monoxide stream is obtained by the partial oxidation of organic materials, and particularly carbon at high temperature with oxygen, air or steam. Likewise, a carbon monoxide stream suitable for use herein can be prepared by the reduction of carbon dioxide by hydrogen, carbon or certain metals at high temperatures. For example, a gas stream containing about 40% carbon monoxide is easily prepared by blowing steam through a bed of coal at an elevated temperature. Another suitable carbon monoxide-containing stream is obtained by simultaneously blowing air and stream through a bed of red hot coal to produce a gas stream containing about 30% carbon monoxide. In addition, blast furnace gases resulting from the reduction of iron oxide by red hot coke can be utilized to supply the necessary carbon monoxide stream if desired. Yet another source of a suitable carbon monoxide stream is a stream prepared by passing carbon dioxide and oxygen through charcoal or coke at a temperature greater than about 1,000° C. in order to dceompose the $CO_2$ to CO. Because it has the highest inherent tendency to produce polysulfide and because it is somewhat more economic, the preferred second reducing agent is carbon monoxide or a stream of reducing gas which is relatively rich in carbon monoxide.

This primary reduction step can be carried out, if desired, without the use of a catalyst; however, in many cases it is advantageous to use a catalyst for this reaction. Based on my investigations I have determined that improved results are obtained in this second step when the reaction zone contains materials such as particles of charcoal, and particles of activated carbon. Particularly good results are obtained with a catalyst comprising a metallic component, selected from the group consisting of the transition metals and compounds of Groups VI and VIII such as chromium, molybdenum, tungsten, iron, cobalt, nickel, platinum, palladium and compounds thereof. From this, I have concluded that preferred catalysts for the desired reduction reaction comprise a combination of catalytically effective amounts of a group VI or a group VIII transition metal component with a suitable porous support such as alumina or activated carbon. Particularly preferred embodiments of the present method involve the use of catalysts in which the metallic component is present in the form of a metallic sulfide. Specifically, a combination of a metallic sulfide selected from the sulfides of the transition metals of group VI and VIII of the Periodic Table such as cobalt sulfide, or molybdenum sulfide, or tungsten sulfide combined with a carrier material. The preferred carrier materials are activated carbons such as those commercially available under the trade names of Nonite. Nuchar, Darco and other similar products. In addition, other conventional natural or synthetic highly porous inorganic carrier materials may be used as the support for the metallic component such as alumina, silica, silica-alumina, etc. Best results are ordinarily obtained with a catalyst comprising cobalt or molybdenum or tungsten sulfide combined with relatively small particles of activated carbon. Excellent results have been obtained with 10 to 12 mesh activated carbon particles containing about 5 wt. percent of cobalt sulfide. In general, the amount of the metallic component utilized in the catalyst should be sufficient to comprise about 0.1 to about 50% or more thereof, calculated on a metallic sulfide basis. These catalysts can be prepared according to any of the conventional procedures for combining a metallic component with a carrier material, with an impregnation procedure with a soluble, decomposable compound of the desired group VI or VIII metal followed by conventional sulfiding ordinarily giving best results.

This primary reduction step can be carried out in a conventional reaction zone in any suitable manner. The thiosulfate-containing effluent stream from the first step can be passed into the reaction zone in either upward, radial or downward flow and the second reducing agent can be simultaneously introduced into the reaction zone in either countercurrent or concurrent flow relative to the thiosulfate-containing effluent stream. Likewise, the sulfide reactant can be added thereto in any conventional manner. In particular, a preferred embodiment of this step involves downward flow of the thiosulfate stream with concurrent flow of a gas stream containing $H_2S$ and the second reducing agent. It is preferred to utilize suitable means in the reaction zone for effecting intimate contact between a liquid stream and a gas stream. Suitable contacting means include bubble trays, baffles and any of the various packing materials known to those skilled in the art. In the preferred case where a catalyst is utilized in this primary reduction step, best results are ordinarily obtained when the catalyst is maintained within the reaction zone as a fixed bed of relatively small particles. These catalyst particles perform the dual functions of catalyzing the desired reaction and of promoting intimate contact between the gas and liquid streams. In the preferred concurrent flow mode of operation for this step, the effluent stream withdrawn from this step typically has both a liquid component and a gas component. The liquid component contains the corresponding polysulfide compound and a minor amount of the corresponding sulfide compound. It is particularly noteworthy that this liquid stream contains only a trace amount of the corresponding sulfate compound. For example, in the case where the input stream to this second step contains ammonium thiosulfate, this aqueous effluent stream will primarily contain ammonium polysulfide with minor amounts of ammonium hydrosulfide, unreacted ammonium thiosulfate, ammonium carbonate and ammonium hydroxide.

The reduction conditions utilized in this primary reduction step are typically relatively more severe than those utilized in the preliminary treatment step and can be generally characterized as reduction conditions sufficient to effect conversion of thiosulfate to polysulfide. The temperature is preferably relatively high and typically selected from the range of about 125 to about 350° C., with best results obtained at a relatively high temperature of about 175 to about 350° C. It is an essential feature of the present invention, that the second step be conducted under liquid phase conditions; accordingly, the pressure employed must be sufficient to maintain at least a portion of the effluent stream from the first step in the liquid phase. Typically the pressure is selected from the range of about 100 to about 3,000 p.s.i.g., as a function of the reaction temperature in order to be substantially in excess of the pressure required to maintain the desired liquid phase condition. In general, best results are obtained at the relatively high pressure. For example, particularly good results are obtained at a temperature of about 200° C., and a pressure of about 500 p.s.i.g. It is preferred to use a relatively lower liquid hourly space velocity (defined on the basis of the liquid volume charge rate of the effluent stream from the first step divided by the volume of the reaction zone utilized in this second step in the case where a catalyst is not utilized and by the volume of the catalyst bed in the case where a catalyst is used in this second step). Preferably, this parameter is selected from the range of about 0.1 to about 10 hrs.$^{-1}$, with best results obtained at about 0.1 to about 2 hrs.$^{-1}$. Excellent results have been obtained in this primary reduction step with a LHSV of 1 hr.$^{-1}$.

Regardless of the exact composition or source of this second reducing agent, it is preferably charged to this primary reduction step in an amount sufficient to provide a mole ratio of reducing agent to thiosulfate compound of about 1:1 to about 10:1, with best results obtained at a mole ratio of about 1.5:1 to about 3:1. It is to be noted that this primary reduction step is preferably conducted with unreacted second reducing agent being continuously recycled thereto by means of a flow circuit between this step and the polysulfide decomposition step. In the preferred mode of operation the entire amount of necessary reducing power is supplied to the system by means of this second reducing agent. That is, the only externally desired reducing agent in this preferred mode is the second reducing agent. When the system is lined-out in this latter case, only the net amount of second reducing agent necessary to produce elemental sulfur must be continuously added to the system. For either hydrogen or carbon monoxide as the second reducing agent, this stoichiometric amount is 2 moles of reducing agent per mole of sulfite compound contained in the input water stream. Obviously, when a portion of the sulfide reactant utilized in this primary reduction step is obtained from a source external to the present process, this stoichiometric amount is reduced proportionally.

The effluent stream withdrawn from this primary reduction step will contain the corresponding polysulfide compound, minor amounts of a sulfide compound and, in many cases, substantial amounts of unreacted second reducing agent. If the primary reduction step is run so that not all of the second reducing agent is reacted therein, the unreacted second reducing agent may be separated from this effluent stream in an optional separating step before the polysulfide is decomposed. This optional separating step merely involves passing the total effluent from the primary reduction step to a separating zone maintained at conditions sufficient to separate a gaseous phase from a liquid phase. The gaseous phase comprises the unreacted second reducing agent with minor amounts of $H_2S$ and $H_2O$ and this phase can be withdrawn from this zone and recycled to the primary reduction step. The liquid phase from this zone would then contain polysulfide and sulfide compounds and it would be passed to the decomposition step. In the preferred case, the total effluent stream from the primary reduction step is passed to the decomposition step and any unreacted reducing gas contained in same is recovered and recycled when the polysulfide is decomposed.

After this primary reduction step, a polysulfide-containing aqueous effluent stream is withdrawn therefrom and at least a portion of it subjected to a polysulfide decomposition step. As previously explained, in one embodiment of the present process, the other portion of this effluent stream is passed to the preliminary treatment step in order to supply the first reducing agent thereto. Any suitable procedure known to the art for decomposing a polysulfide compound can be utilized in this step. One acceptable procedure involves the addition of an acidic material such as carbonic acid, sulfuric acid, hydrochloric acid, nitric acid and the like acids to this effluent stream in an amount sufficient to lower the pH of the solution to a value below 7. Another method involves heating the effluent to a critical temperature in a closed vessel as is shown in U.S. Pat. No. 1,783,725. When the alkaline reagent used is ammonia, a preferred procedure for use in this step involves subjecting the ammonium polysulfide-containing effluent stream to thermal decomposition conditions effective to produce an overhead stream containing hydrogen sulfide and water and a bottoms stream containing ammonium carbonate and/or ammonium hydroxide and elemental sulfur. Suitable polysulfide decomposition conditions include a temperature of about 100 to 200° C. and a pressure of about 1 to about 75 p.s.i.g. It is preferred to operate the polysulfide-decomposition step in this thermal decomposition mode so that a relatively low temperature is maintained at the top of the decomposition zone. Ordinarily this object is conventionally accomplished by using a portion of the bottom water stream from the zone to cool the top of the column and to prevent $NH_3$ carry-over. Excellent results have been obtained in the decomposition of ammonium polysulfide by taking 20 vol. percent of the polysulfide-containing effluent stream overhead at a temperature of 140° C. and a pressure of 40 p.s.i.g. Generally, this step can be conducted in a distillation zone wherein $H_2S$ is stripped from the polysulfide-containing solution with the aid of a suitable upflowing gas stream such as stream, nitrogen, air and carbon dioxide which is typically injected into the bottom of the distillation zone. Of course, upflowing vapors can be generated in the distillation zone by supplying heat to the bottom of same by means such as a steam coil or a conventional reboiler. When the temperature utilized in the bottom of the distillation zone is less than the melting point of sulfur, the elemental sulfur produced in this step will be present in the form of a slurry of solid particles in the aqueous bottom stream withdrawn therefrom. This sulfur-containing aqueous stream can be subjected to any of the techniques known in the art for removing a solid from a liquid such as filtration, settling, centrifuging and the like operation to remove sulfur therefrom and to form a treated water stream. On the other hand, when the decomposition temperature utilized in this step is greater than the melting point of sulfur, the bottom stream from the distillation column can be a mixture of liquid sulfur in an aqueous stream. This mixture can then be passed to a settling zone wherein the liquid sulfur can be allowed to settle and form a separate sulfur phase. In this last case, the separation of liquid sulfur from the treated water stream can be performed, if desired, in the lower region of the distillation column by allowing a liquid sulfur phase to collect at the bottom of the zone and separately drawing it off as a bottom stream. The treated water stream is then drawn off as a side stream.

From this polysulfide decomposition step, there is obtained a sulfur product stream and a treated water stream having a substantially lower sulfur content than the input water stream. In addition, there is obtained from this step a stream containing the sulfide compound formed therein. In the cases where this decomposition step is performed so that $H_2S$ is liberated therein, this last stream is a gaseous stream containing $H_2S$. In other cases the sulfide product of the decomposition step is present in the treated water stream as the corresponding sulfide or hydrosulfide of the particular alkaline reagent present in the input water stream. In this latter case, the sulfide compound is recovered by stripping it from the treated water stream according to any of the sulfide stripping techniques known to the art to form a gaseous stream containing $H_2S$. In either situation, a gaseous stream containing $H_2S$ is available, and in accordance with the present invention, at least a portion of its is pressed to the primary reduction step in order to supply at least a portion of the necessary sulfide reactant therefor. It is to be noted that it is within the scope of the present process to pass the gas stream per se to the primary reduction step or to reabsorb the $H_2S$ in an alkaline solution and pass the resulting liquid solution to the primary reduction step. In the case where a portion of the sulfide product of the decomposition step is also used as the first reducing agent in the preliminary treatment step, it is also within the scope of the current process to pass the sulfide reactant to the primary reduction step by means of this preliminary treatment step. Specifically, to pass all of the sulfide product stream from the decomposition step to the preliminary treatment step where only a portion will react. The unreacted portion of the sulfide reactant is then carried in the effluent from the first step to the primary reduction step. The preferred mode of operation is, however, to pass the required portion of the sulfide product stream from the decomposition step directly to the primary reduction step.

Having broadly characterized the essential steps comprising the instant process, reference is now made to the attached drawing for a detailed explanation of a working example of a preferred embodiment of the present invention. The attached drawing is merely intended to be a general representation of the flow scheme employed with no intent to give details about heating means, cooling means, pumps, compressors, valves and control equipment execpt where a knowledge of these devices is necessary for a proper understanding of the present invention or would not be self-evident to those skilled in the relevant art.

Referring now to the attached drawing, an input water stream containing an equimolar mixture of ammonium sulfide and ammonium bisulfide in an amount of about 10 wt. percent thereof is continuously introduced into the system via line 1 and commingled with the first reducing agent at the junction of line 1 with either lines 15, 8 or 13, depending upon which first reducing agent is utilized in the preliminary treatment step. In the case where the first reducing agent is elemental sulfur, it is obtained from a subsequently described decomposition zone 10 by means of lines 12 and 13 with valve 14 open and valves 9 and 17 in a closed position. In the situation where the first reducing agent is ammonium polysulfide, it is obtained as a portion of the effluent stream from a subsequently described reduction zone 6 by means of lines 7 and 8 with valve 9 in the open position and valves 14 and 17 in the closed position. The third internal source for this first reducing agent is a portion of the sulfide product of the subsequently described polysulfide decomposition step which in the case under consideration is hydrogen sulfide and is passed to the preliminary treatment step via line 15 with valve 17 in an open position and valves 14 and 9 in a closed position. It is to be noted that it is within the scope of the present invention to use a mixture of reducing agents in an open position and valves 14 and 9 in a closed position of valves 17, 9 and 14. During starting-up of the process the necessary reducing agent to initiate the reaction in zone 4 can be obtained from an external source or can be internally generated by passing the input water stream directly to zone 6 until sufficient reducing agent becomes available. In the preferred case, the first reducing agent is a portion of the hydrogen sulfide produced in the decomposition step. It is supplied to the junction of lines 1 and 15 in an amount sufficient to provide about 1 mole of sulfide reactant per mole of sulfite contained in the input water stream. The resulting mixture of input water stream and sulfide reactant is then charged via line 1 into reaction zone 4. Zone 4 is a thermal reaction zone containing conventional contacting means. Zone 4 is by conventional means maintained at a temperature of 65° C. and a pressure of about 50 p.s.i.g. The flow rates of the streams to zone 4 are adjusted to result in a residence time of reactants therein of about five minutes. These conditions with this preferred first reducing agent, $H_2S$, result in a conversion of 95% of the sulfite compound contained in the input water stream to ammonium thiosulfate with less than 2% being converted to undesirable intractable ammonium sulfate.

An effluent stream containing ammonium thiosulfate, unreacted sulfide, unreacted sulfite, etc. is then withdrawn from zone 4 via line 5 and commingled with a carbon monoxide stream at the junction of line 3 and line 5. In the case here considered, this carbon monoxide stream is the second reducing agent. In addition this effluent stream is commingled with a recycle gas stream containing hydrogen sulfide and unreacted carbon monoxide at the juncture of line 5 with line 18. The resulting mixture is then passed via line 5 into reduction zone 6. Zone 6 is a conventional reaction zone designed to effect intimate contact between a concurrently flowing gas and a liquid stream. Zone 6 contains a catalyst comprising 10 to 12 mesh particles of activated carbon having a cobalt sulfide component combined therewith in an amount sufficient to result in the composition containing about 5 wt. percent cobalt sulfide. The total amount of carbon monoxide passed into zone 6 corresponds to a mole ratio of carbon monoxide to ammonium thiosulfate of about 4:1. The sulfide reactant introduced in zone 6 comes from two sources; unreacted sulfide from zone 4 and recycle sulfide from zone 10. The total amount of sulfide reactant introduced into zone 6 corresponds to a mole ratio of sulfide reactant to carbon monoxide of about 0.3:1. During start-up of the process the hydrogen sulfide necessary to initiate the desired reaction in zone 6 is introduced into the system via line 2. Thereafter, for the example under consideration, all of the sulfide reactant necessary for the operation of zone 6 is obtained from zone 10. It is to be noted that a substantial excess of sulfide reactant and second reducing agent is allowed to accumulate in the flow circuit between zone 6 and 10 in order to facilitate the desired reaction in zone 6. After the process is lined-out, only the stoichiometric amount of carbon monoxide necessary to reduce the sulfite compound contained in the input water stream to elemental sulfur is passed to the system via line 3. This amount is 2 moles of carbon monoxide per mole of sulfite compound. Zone 6 is maintained by conventional means at a pressure of 750 p.s.i.g., a temperature of 200° C. and the flow rates of the reactants into zone 6 are adjusted to result in a LHSV of 1 hr.$^{-1}$.

An effluent stream is then withdrawn from zone 6 via line 7, cooled by conventional means and passed to decomposition zone 10. In the case where the first reducing agent utilized in zone 4 is a polysulfide compound, a portion of this effluent from zone 6 is diverted by means of line 8 to zone 4 as previously explained. An analysis of the effluent stream from zone 6 indicates that 99% of the ammonium thiosulfate charged to zone 6 is converted therein. In addition, this analysis indicates that the selectivity for elemental sulfur contained in ammonium polysulfide is greater than about 60% with a corresponding selectivity for sulfide of about 35%. The amount of undesired ammonium sulfate formed in the reaction zone 6 is less than 1% of the total amount of sulfur charged to this zone.

The resulting ammonium polysulfide-containing effluent stream withdrawn from zone 6 is passed into decomposition zone 10 via line 7 and is subjected in zone 10 to conditions designed to decompose the polysulfide into $H_2S$, elemental sulfur and a treated aqueous stream. Preferably zone 10 is a conventional multi-plate distillation zone which is operated at a bottoms temperature of 140° C. and a pressure of about 40 p.s.i.g. to produce an overhead stream containing $H_2S$, $H_2O$, unreacted CO and minor amounts of $NH_3$ and $CO_2$ which is withdrawn therefrom via line 15. Also produced in zone 10 is a side stream comprising the treated water stream which is withdrawn therefrom via line 11 and found to contain substantial amounts of ammonium carbonate and bicarbonate and some ammonium hydroxide. Typically at the stated conditions this side stream will contain less than 800 p.p.m. of sulfide. The elemental sulfur produced in zone 10 is a liquid form since the zone is operated at a temperature above the melting point of sulfur. This liquid sulfur collects at the bottom of zone 10 is withdrawn therefrom via line 12. In one mode of zone 4, a portion of this liquid sulfur stream is passed to the preliminary treatment step via line 13 as previously explained. Generally, the decomposition reaction in zone 10 can be conveniently accomplished by taking 20 to 30 vol. percent of the liquid stream extending zone 10 via line 7 overhead. In addition, it is necessary to maintain a relatively low temperature at the top of zone 10 in order to prevent substantial amounts of $NH_3$ from being carried out of the zone in the overhead stream. This control of top temperature is conveniently accomplished by injecting a relatively cool water stream into the top of zone 10. A preferred source for this scrubbing stream is a cooled portion of the treated water stream withdrawn from zone 10 via line 11. This cooled water stream acts to scrub $NH_3$ out of the overhead stream withdrawn from zone 10 via line 15.

Turning to the overhead gaseous stream produced in zone 10, it is withdrawn therefrom via line 15 and at least a portion of its passed via lines 15, *b*8 and 5 to reduction zone 6. In the case where carbon dioxide builds up in this overhead stream to undesired levels, a drag stream can be withdrawn therefrom via line 16 and vented from the system. This overhead gas stream primarily contains $H_2S$ and CO. In addition, it contains minor amounts of $H_2O$, $NH_3$ and $CO_2$. It is passed to the junction of line 15 with line 18 wherein it is divided into two portions. The first first portion then continues on via line 15, valve 17 and line 1 to reaction zone 4 wherein it is used to supply the first reducing agent. The second portion of this overhead stream is passed via line 18 to the junction of line 18 with line 2 where during start-up additional quantities of $H_2S$ can be added. The second portion is commingled with the effluent stream from zone 4 at the junction of line 18 with line 5 and with additional make-up carbon monoxide at the junction of line 18 and line 5 with line 3.

The process as described is operated for a substantial period of time and it is found that high selectivity for polysulfide is maintained within reduction zone 6. Specifically, on an over-all basis about 90% of the ammonium sulfite and bisulfite entering the process via line 1 is recovered as elemental sulfur via line 12. Moreover, less than 5% of this sulfite is converted to undesired intractable ammonium sulfate.

It is intended to cover by the following claims all changes and modifications of the above disclosure of the present invention which would be self evident to a man of ordinary skill in the water treating art.

I claim as my invention:

1. A process for treating an input water stream containing a water-soluble sulfite compound in order to produce elemental sulfur and a treated water stream while minimizing the formation of sulfate byproducts said process comprising the steps of:
   (a) contacting the input water stream with a first reducing agent, selected from the group consisting of finely divided sulfur, a polysulfide compound, a water-soluble sulfide compound and mixtures thereof, at thiosulfate production conditions selected to form a thiosulfate-containing effluent stream;

(b) reacting the effluent stream from step (a) with a water-soluble sulfide compound and a second reducing agent, selected from the group consisting of carbon monoxide, hydrogen, and mixtures thereof, at reduction conditions selected to result in an effluent stream containing a polysulfide compound;

(c) subjecting at least a portion of the effluent stream from step (b) to polysulfide decomposition conditions effective to form elemental sulfur, a sulfide compound and a treated water stream; and (d) recovering the sulfide compound formed in step (c) and passing at least a portion of same to step (b).

2. A process as defined in claim 1 wherein the sulfite compound contained in the input water stream is ammonium sulfite or ammonium bisulfite.

3. A process as defined in claim 1 wherein the sulfite compound contained in the input water stream is an alkali metal sulfite or an alkali metal bisulfite.

4. A process as defined in claim 3 wherein the alkali metal sulfite compound is sodium sulfite or sodium bisulfite.

5. A process as defined in claim 1 wherein the sulfite compound contained in the input water stream is an alkaline earth sulfite or an alkaline earth bisulfite.

6. A process as defined in claim 1 wherein the thiosulfate production conditions utilized in step (a) include a temperature of about 20 to about 150° C. and a pressure at least sufficient to maintain the input water stream in the liquid phase.

7. A process as defined in claim 1 wherein the reduction conditions utilized in step (b) include a temperature of about 125 to about 350° C. and a pressure at least sufficient to maintain the effluent stream from step (a) in the liquid phase.

8. A process as defined in claim 1 wherein the amount of the second reducing agent charged to the process is sufficient to provide a mole ratio of reducing agent to sulfite compound, entering the process in the input water stream of about 2:1.

9. A process as defined in claim 1 wherein the entire amount of water-soluble sulfide compound utilized in step (b) is obtained by recycle from step (d).

10. A process as defined in claim 1 wherein the first reducing agent is a portion of the elemental sulfur formed in step (c).

11. A process as defined in claim 1 wherein the first reducing agent is a portion of the effluent stream containing a polysulfide compound which is produced in step (b).

12. A process as defined in claim 1 wherein the first reducing agent is a portion of the sulfide compound recovered in step (d).

13. A process as defined in claim 1 wherein the sulfide compound recovered in step (d) is hydrogen sulfide.

14. A process as defined in claim 1 wherein the input water stream contains about 0.1 to about 30 wt. percent of the sulfite compound.

15. A process as defined in claim 1 wherein step (b) is performed in the presence of a catalyst.

16. A process as defined in claim 15 wherein the catalyst is activated carbon or charcoal.

17. A process as defined in claim 15 wherein the catalyst comprises a combination of a metallic component selected from the group consisting of the transition metals of groups VI and VIII of the Periodic Table and compounds thereof, with a porous carrier material.

18. A process as defined in claim 17 wherein the catalyst is cobalt sulfide combined with activated carbon.

19. A process for treating an input water stream containing ammonium sulfite or ammonium bisulfite in order to produce elemental sulfur and a treated water stream while minimizing the formation of ammonium sulfate, said process comprising the steps of:

(a) contacting the input water stream with a first reducing agent, selected from the group consisting of finely divided sulfur, ammonium polysulfide, hydrogen sulfide, ammonium hydrosulfide and mixtures thereof, at thiosulfate production conditions selected to form an effluent stream containing ammonium thiosulfate;

(b) reacting the effluent stream from step (a) with hydrogen sulfide and a second reducing agent, selected from the group consisting of carbon monoxide, hydrogen and mixtures thereof, at reduction conditions selected to result in an effluent stream containing ammonium polysulfide;

(c) subjecting at least a portion of the effluent stream from step (b) to polysulfide decomposition conditions effective to form elemental sulfur, hydrogen sulfide and a treated aqueous stream; and (d) recovering the hydrogen sulfide formed in step (c) and passing at least a portion of same to step (b).

20. A process as defined in claim 19 wherein step (b) is performed in the presence of a catalyst comprising a combination of a metallic sulfide, selected from the sulfides of the transition metals of groups VI and VIII of the Periodic Table, combined with a porous carrier material.

21. A process as defined in claim 20 wherein the catalyst comprises cobalt sulfide combined with an activated carbon carrier material.

References Cited

UNITED STATES PATENTS

| | | | |
|---|---|---|---|
| 1,636,106 | 7/1927 | Naef | 23—137 |
| 3,536,618 | 10/1970 | Urban et al. | 23—224 X |
| 1,062,120 | 5/1913 | Sanborn | 23—225 |

FOREIGN PATENTS

| | | | |
|---|---|---|---|
| 947,640 | 1/1964 | Great Britain | 23—225 |

OSCAR R. VERTIZ, Primary Examiner

G. O. PETERS, Assistant Examiner